United States Patent [19]

Cooper

[11] 4,306,693

[45] Dec. 22, 1981

[54] AIRCRAFT WITH JETTISONABLE FUEL TANK MEANS

[76] Inventor: Isaac B. Cooper, 1641 Northbrook Dr., Charlotte, N.C. 28216

[21] Appl. No.: 927,811

[22] Filed: Jul. 25, 1978

Related U.S. Application Data

[63] Continuation-in-part of Ser. No. 793,594, May 4, 1977, abandoned.

[51] Int. Cl.² .............................................. B64D 37/26
[52] U.S. Cl. .................................. 244/135 R; 244/140; 244/149; 137/572
[58] Field of Search .................... 244/147, 149, 138 R, 244/139, 140, 120, 141, 135 R, 124; 137/572, 576

[56] References Cited

U.S. PATENT DOCUMENTS

| | | | |
|---|---|---|---|
| 2,623,721 | 12/1952 | Harrington | 244/135 R |
| 2,702,680 | 2/1955 | Heinemann et al. | 244/140 |
| 2,749,065 | 6/1956 | Soule | 244/141 |
| 2,764,374 | 9/1956 | Anderson et al. | 244/135 R |
| 3,409,254 | 11/1968 | Nastase | 244/135 R |
| 3,677,284 | 7/1972 | Mendez | 137/572 |
| 3,754,569 | 8/1973 | Fallotico | 137/572 |

FOREIGN PATENT DOCUMENTS

| | | | |
|---|---|---|---|
| 598138 | 5/1960 | Canada | 244/135 R |
| 286735 | 5/1914 | Fed. Rep. of Germany | 244/135 R |
| 629362 | 7/1927 | France | 244/135 R |

*Primary Examiner*—Galen L. Barefoot
*Attorney, Agent, or Firm*—Bell, Seltzer, Park & Gibson

[57] ABSTRACT

A powered aircraft has a jettisonable fuel tank releasably secured in the bottom of its fuselage. A valve is arranged to shut off fuel flow from the tank upon releasing of the tank from the fuselage, whereupon a parachute connected to the tank is released to slow the descent of the tank. Additionally, a reserve fuel tank in the fuselage is normally connected to the jettisonable fuel tank, and the valve is so arranged that fuel flow communication is normally maintained between the jettisonable fuel tank and the aircraft engine while fuel is prevented from flowing from the reserve tank to the engine. However, when the jettisonable fuel tank is released from the fuselage, the valve shuts off the flow of fuel from the jettisonable fuel tank and establishes open communication between the reserve tank and the engine to permit continued operation of the aircraft under power of the engine.

5 Claims, 9 Drawing Figures

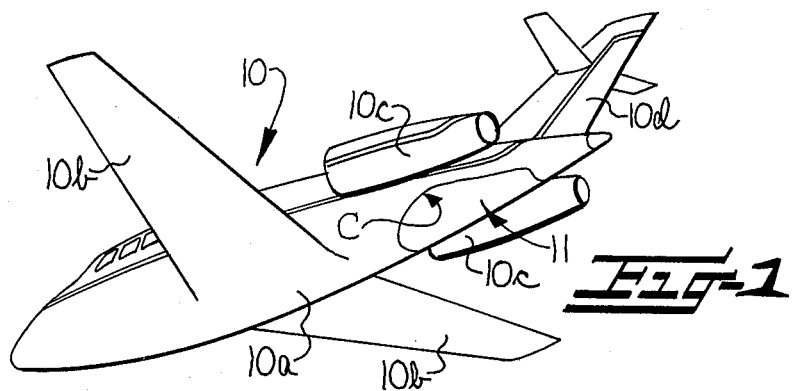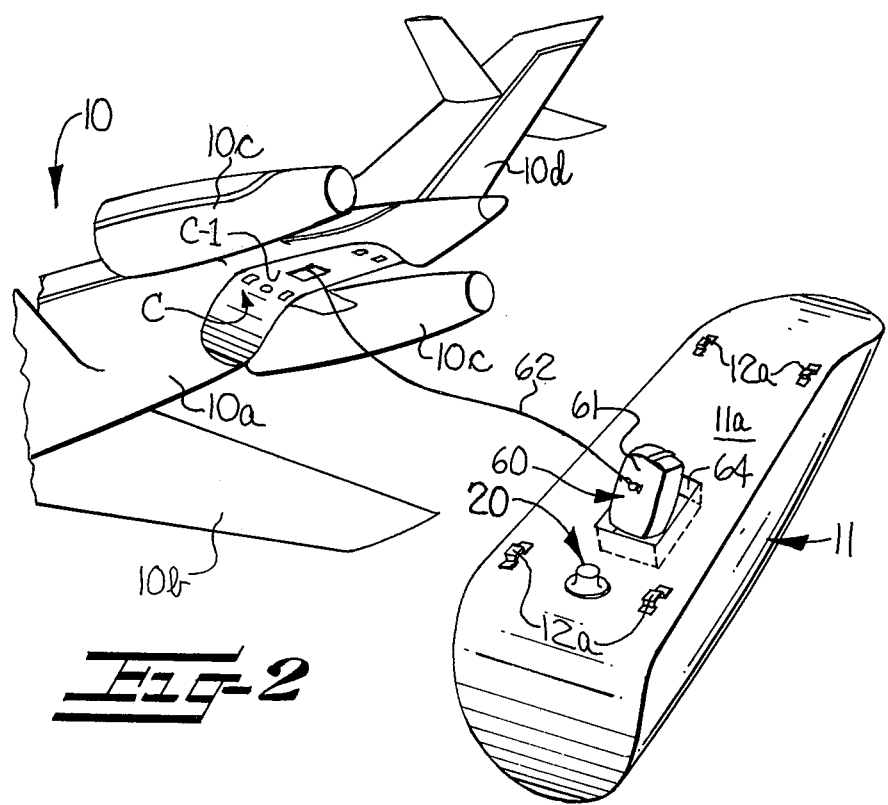

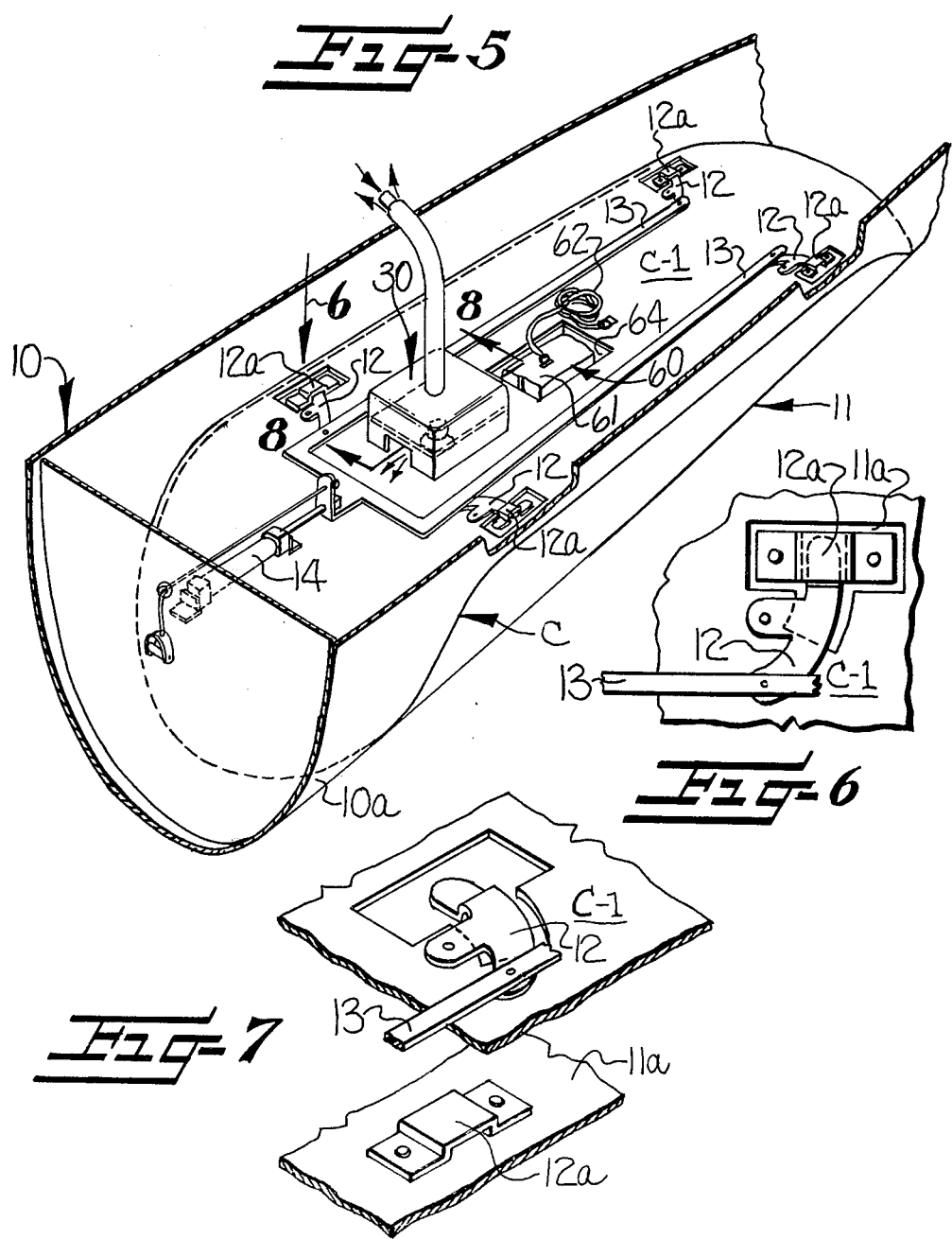

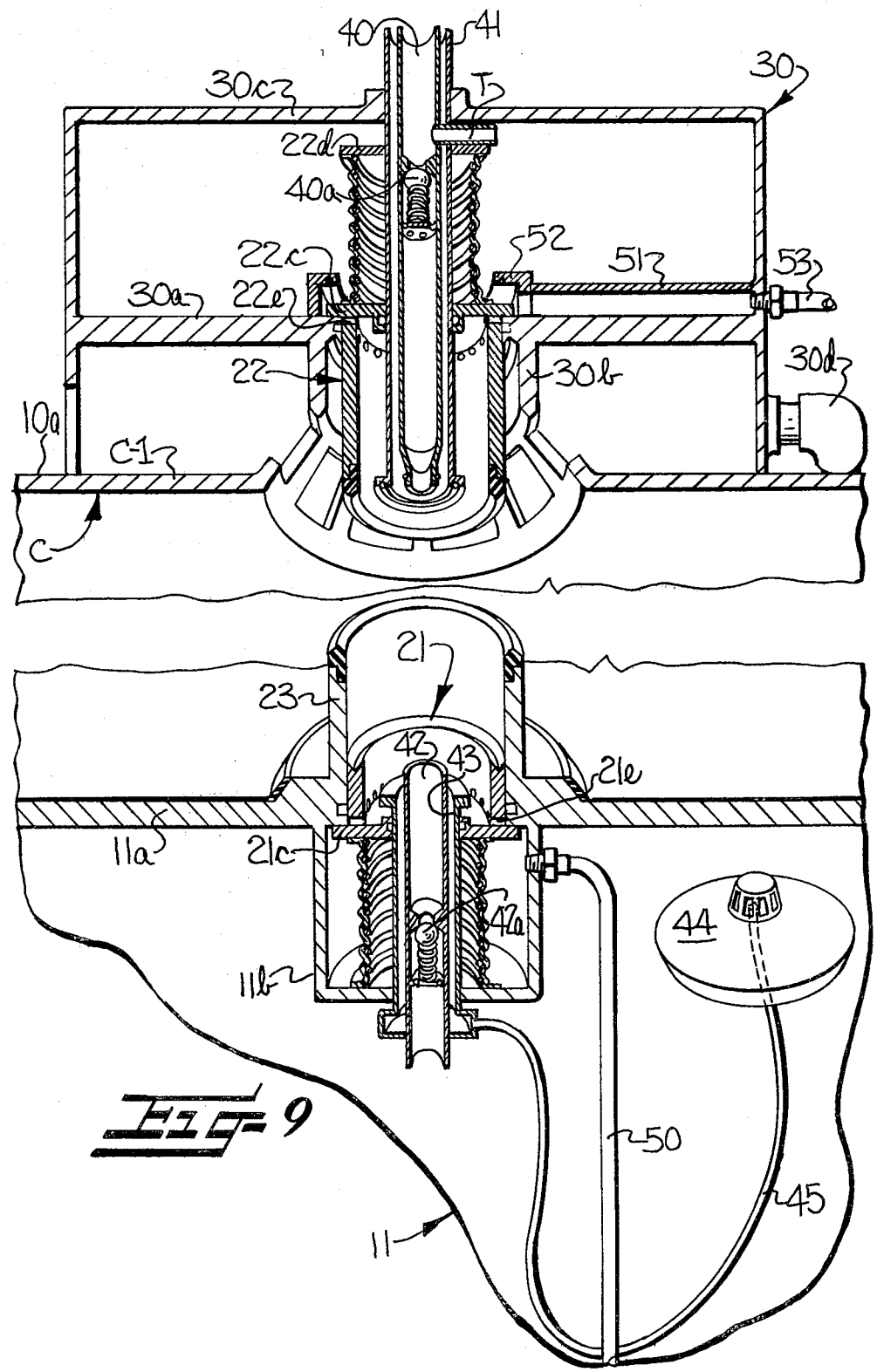

AIRCRAFT WITH JETTISONABLE FUEL TANK MEANS

This application is a continuation-in-part of my co-pending application Ser. No. 793,594 filed May 4, 1977, now abandoned and entitled AIRCRAFT PARACHUTED FUEL TANK EJECTION.

FIELD OF THE INVENTION

This invention relates to an improved fuel tank system for aircraft, and more particularly, to jettisonable fuel tank means and related self-sealing valve means therefor.

BACKGROUND OF THE INVENTION

Various types of jettisonable fuel tank arrangements have been proposed heretofore for aircraft as exemplified in the U.S. Pat. of Anderson et al, No. 2,764,374, dated Sept. 25, 1956. To my knowledge, however, such prior art types of jettisonable fuel tank arrangements have been so constructed and located with respect to the aircraft body or fuselage as to present objectionable masses or obstructions to smooth air flow producing undesirable "drag" effects on the aircraft during normal operation thereof.

It is therefore an object of this invention to provide an improved jettisonable fuel tank means cooperatively joined to the aircraft in such a manner as to overcome the objections of the known prior art by providing a generally aerodynamically smooth, streamlined outer surface to the aircraft.

Another object of the invention is to provide an improved valve means between the jettisonable fuel tank means and the fuselage of the aircraft for shutting off fuel flow from the fuel tank means in response to release of the tank means from the fuselage to which it is normally detachably secured.

Still another object of the invention is to provide a valve means of the type last described wherein such valve means serves normally to connect the jettisonable fuel tank means to a reserve fuel tank means carried by the aircraft, and wherein the valve means serves to normally maintain open fuel flow communication between the jettisonable fuel tank means and the engine of the aircraft while preventing fuel flow communication between the reserve fuel tank and the engine during normal operation of the aircraft, and further, wherein the valve means includes means responsive to the jettisoning of the jettisonable fuel tank means from the aircraft for establishing communication between the reserve fuel tank means and the engine to permit continued operation of the aircraft under the power of the engine after the jettisonable fuel tank means has been released from the aircraft.

BRIEF DESCRIPTION OF THE DRAWINGS

Some of the objects and advantages of the invention having been stated, other objects and advantages will appear as the description proceeds when taken in connection with the accompanying drawings in which FIG. 1 is a perspective view looking upwardly at the lower portion of an aircraft as it might appear in flight, and showing a jettisonable fuel tank means suspended from a portion of the aircraft;

FIG. 2 is an enlarged view of the rear portion of the aircraft of FIG. 1 following releasing of the jettisonable fuel tank means therefrom and showing a static line means extending from the aircraft fuselage to a parachute associated with the fuel tank means;

FIG. 5 is a further enlarged fragmentary perspective view of the lower rear portion of the aircraft fuselage shown in FIG. 2, with the jettisonable fuel tank means occupying its normal operative position in the cavity provided therefor in the bottom of the fuselage, and also illustrating a reserve fuel tank means positioned in the fuselage above the jettisonable fuel tank means;

FIG. 6 is an enlarged fragmentary plan view looking generally in the direction of the arrow 6 of FIG. 5 and showing latch means for detachably securing the jettisonable fuel tank means to the fuselage and being operable for releasing the jettisonable fuel tank means from the fuselage;

FIG. 7 is a fragmentary, partially exploded, perspective view of the portion of the latch means shown in FIG. 6;

FIG. 9 is a fragmentary perspective view similar to FIG. 8, but showing separable sections of the valve means in spaced apart relationship as would be the case following the jettisoning of the jettisonable fuel tank means from the aircraft.

DETAILED DESCRIPTION OF THE INVENTION

Figure 4:
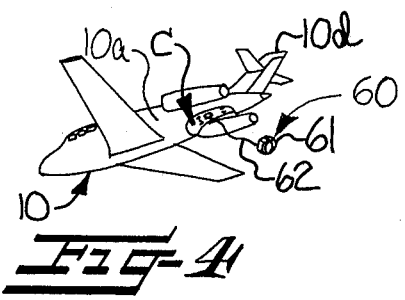
FIG. 4 is a reduced perspective view of the aircraft of FIG. 1 showing the parachute pack and static line means suspended therefrom following the dropping of the jettisonable fuel tank means away from the aircraft.

Referring more specifically to the drawings, in its illustrated embodiment the invention is shown in association with a typical aircraft 10, such as an airplane, including a fuselage 10a, wings 10b, a propelling engine or engines 10c and an empennage 10d. It is apparent that the fuselage 10a has a tail portion extending from the trailing edges of the wings 10b to the rear extremity of the fuselage.

In accordance with the invention, the tail portion of the fuselage is provided with a cavity C for accommodating therein an improved jettisonable or primary fuel tank means 11 for containing fuel and being configured to fit within cavity C and define with fuselage 10a a generally aerodynamically smooth, streamlined outer surface during normal operation of the aircraft (FIG. 1). As best shown in FIGS. 5, 6 and 7, latch means are provided for detachably securing the jettisonable fuel tank means 11 to the fuselage 10a, such latch means being operable for releasing the jettisonable fuel tank means from the fuselage 10a.

Accordingly, such latch means may take the form of a plurality of pivoted latch elements, four in this instance, which are pivotally mounted on that portion of the bottom wall C-1 of the fuselage defining the cavity C. Each of the latches 12 is adapted to engage a suitable keeper element 12a (FIGS. 6 and 8) suitably secured to and projecting upwardly from an upper wall portion 11a of the jettisonable fuel tank means 11. The latches 12 are connected to suitable link means, shown in the form of a yoke in FIG. 5, which may be moved forwardly in that figure by any suitable means, such as a servomotor or fluid cylinder 14 suitably mounted in the aircraft fuselage 10a, for moving the latches 12 out of engagement with the keepers 12a, under control of an operator, for releasing the jettisonable fuel tank means 11 from the fuselage 10a.

Figure 3:
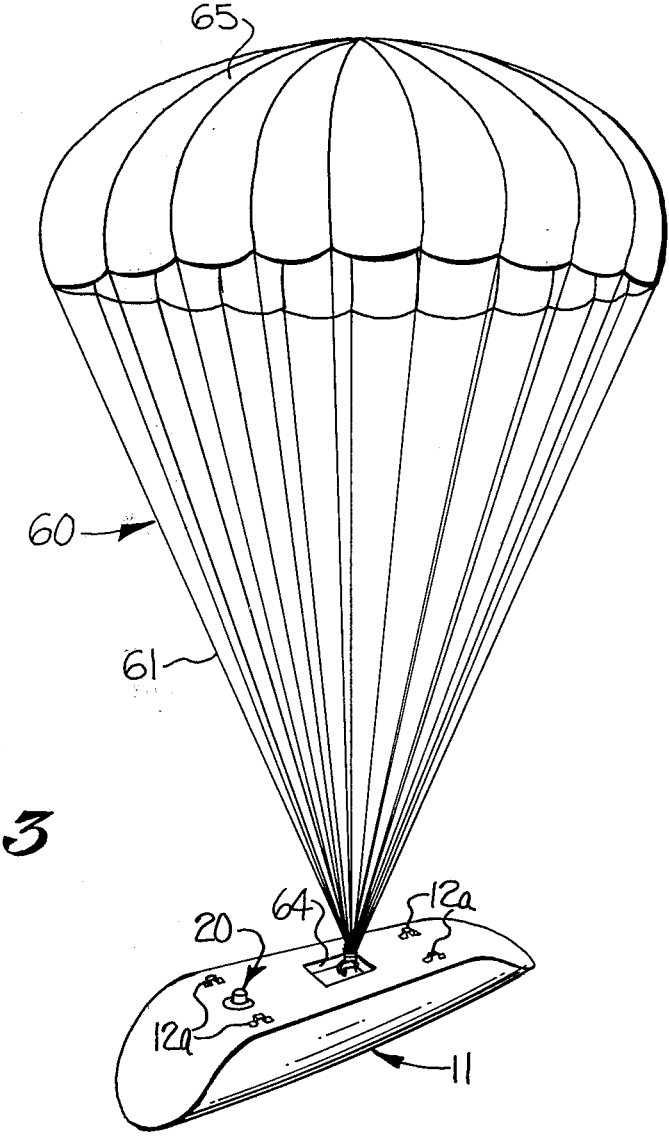
FIG. 3 is a view of the jettisonable fuel tank means following the releasing of the same from the aircraft fuselage and showing the canopy of the associated parachute in fully opened position for slowing the descent of the fuel tank means.

A self-sealing valve means 20 (FIGS. 2, 4, 8 and 9) is interposed between the jettisonable fuel tank means 11 and the fuselage 10a and is operative in response to release of the fuel tank means 11 from the fuselage 10a for shutting off fuel flow to aid in preventing fuel from escaping from the jettisonable fuel tank means 11 after it has been jettisoned as shown in FIGS. 2, 3 and 9. The self-sealing valve means 20, to be presently described in detail, is associated with communicative means normally interconnecting the jettisonable primary fuel tank means 11 and a reserve or secondary fuel tank means 30 carried by the aforementioned bottom wall portion C-1 of the fuselage 10a and preferably being of substantially less fuel capacity than the primary fuel tank means 11. The self-sealing valve means 20 is adapted to normally maintain open fuel flow communication between the primary or first fuel tank means and the engine or engines 10c (FIGS. 1, 2 and 4) via the aforementioned communicative means, during normal operation of the aircraft.

As preferred, the self-sealing valve means 20 is adapted to also normally prevent fuel flow communication between the reserve fuel tank means 30 and the aircraft engine or engines 10c. However, means are provided responsive to the jettisoning of the primary fuel tank means 11, and the consequent separation of the same from the aircraft, for interrupting fuel flow communication between the primary fuel tank means 11 and the engine or engines 10c and for establishing fuel flow communication between the reserve fuel tank means 30 and the engine or engines 10c.

Figure 8:
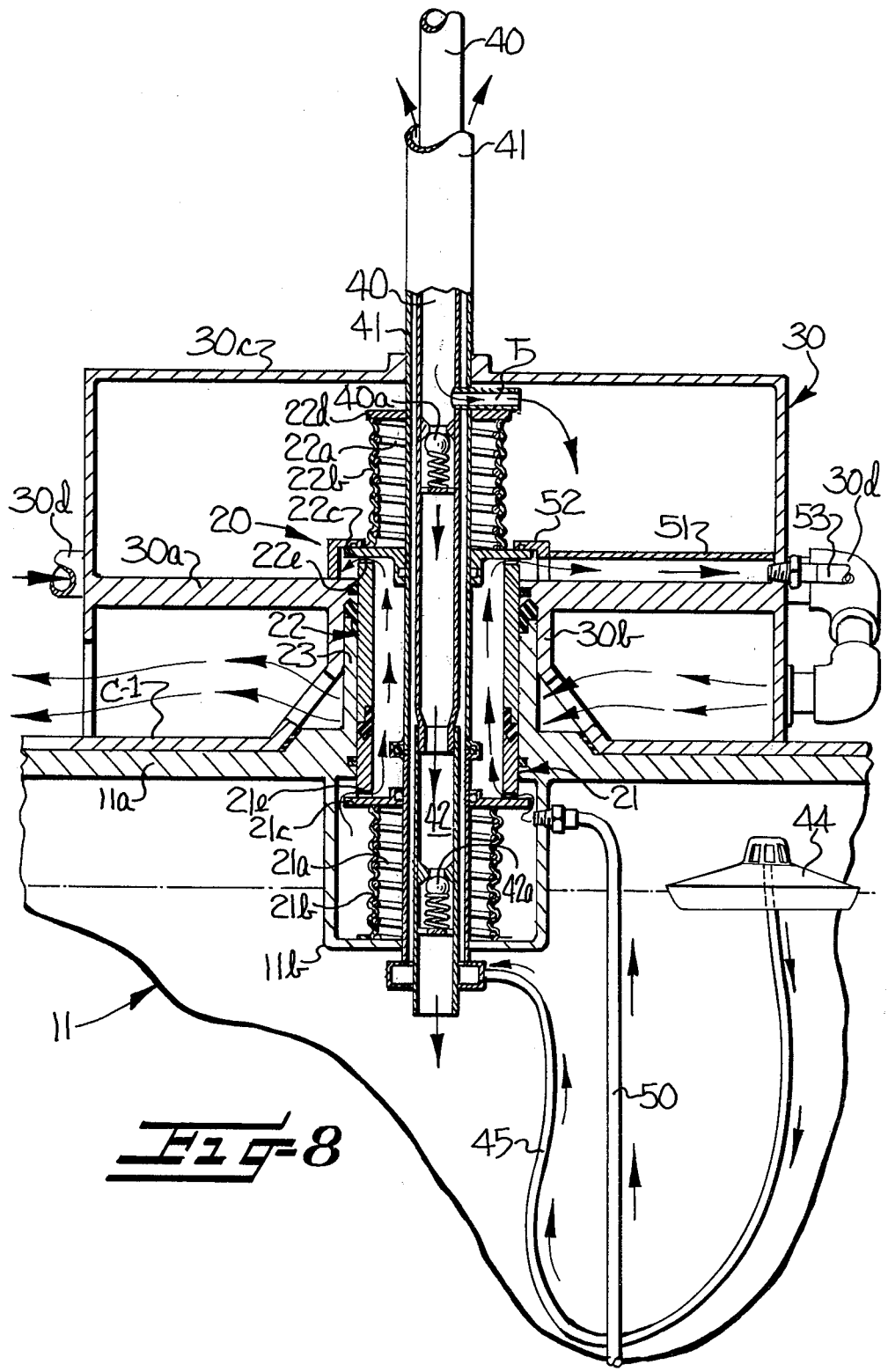
FIG. 8 is an enlarged fragmentary vertical sectional view of a suitable self-sealing valve means interconnecting the jettisonable fuel tank means and the reserve fuel tank means and being taken substantially along line 8—8 in FIG. 5.

A representative embodiment of the valve means 20 is best shown in FIGS. 8 and 9 in association with communicative means including a pair of normally substantially axially aligned, intercommunicating, separable fuel flow components 21, 22 which are attached to, but are axially movable relative to, the respective primary fuel tank means 11 and reserve fuel tank means 30. While the jettisonable fuel tank means 11 occupies its normal or latched position with respect to the fuselage 10a, the proximal ends of the substantially tubular bodies of the fuel flow components 21, 22 are held in sealing interengagement with each other by opposing compression springs 21a, 22a respectively, which may be surrounded by suitable leak proof tubular bellows 21b, 22b.

The reserve fuel tank means 30 is provided with a bottom wall 30a which is spaced above the wall portion C-1 defining the cavity C in the fuselage 10a, but it has a tubular, and downwardly and outwardly flared, supporting standard 30b extending downwardly therefrom whose lower end is suitably attached to the aforementioned wall portion C-1 for supporting the reserve fuel tank means 30 in fixed relation to the fuselage 10a.

The lower flared portion of the supporting standard 30b defines an opening in which a tubular guide means 23 of the jettisonable fuel tank means 11 is normally positioned for being matingly received in the tubular supporting standard 30b, in sealing engagement therewith.

It will be noted that the first and second fuel flow components 21, 22 are arranged to move axially in sliding engagement with the inner wall of the tubular guide means 23 and the upper or second fuel flow component 22 also slidably and sealingly penetrates the bottom wall 30a of the reserve fuel tank means 30. The remote or distal ends of the fuel flow components 21, 22 are provided with respective plate-like closure flanges 21c, 22c thereon, respectively, which are engaged by the proximal ends of the compression springs 21a, 22a, with the distal ends of the springs 21a, 22a being suitably restrained against outward movement with respect to each other. In this instance, the lower end of the compression spring 21a bears against the lower wall of a cup-like housing 11b whose vertical annular wall surrounds the flange 21c and it is suitably secured to and depends from the upper wall 11a of the jettisonable fuel tank means 11. The upper end of the compression spring 22a within the reserve fuel tank means 30 may engage an upper wall 30c of the reserve fuel tank or, as shown, the upper end of the spring 22a engages a washer or disc 22d, which in turn, engages an abutment which takes the form of a lateral branch tube T in this instance.

The branch tube T opens into the reserve fuel tank means 30 and extends radially inwardly where it is communicatively connected to a medial portion of a substantially vertically disposed fuel inlet or filler pipe or conduit 40 positioned within and suitably held in spaced relation from a relatively larger breather pipe or conduit 41. Thus, the pipes 40, 41 define an air vent channel therebetween. The lower portions of the pipes 40, 41 may terminate on about the same horizontal plane as the lower surface of the fuselage wall portion C-1, and they are adapted to be sealingly engaged by the upper ends of respective filler and vent pipe extensions or conduit extensions 42, 43.

The fuel filter pipe 40 and its extension 42 are suitably supported by and within the respective breather pipe 41 and its extension 43, with the breather pipe 41 being suitably secured to and extending through the top wall 30c of the reserve fuel tank means 30. The lower or breather pipe extension 43 is suitably secured to and extends through the bottom wall of the cup-like housing 11b within the jettisonable fuel tank means 11. The lower end of the filler pipe or conduit extension 42 opens into the interior of the jettisonable fuel tank means 11. A floatable vent member 44 is positioned within the jettisonable fuel tank means 11 and is communicatively connected to the lower end of the breather pipe extension 43 by a suitable flexible tube 45. Thus, the ambient air may enter or be exhausted from the jettisonable fuel tank means 11 by way of the vent member 44, the flexible tube 45 and the passageway defined by the inlet pipe 40, its extension 42 and the breather pipe 41 and its extension 43.

Spring-loaded ball check valves 40a, 42a are so positioned in the fuel inlet filler pipe 40 and its extension 42 that liquid fuel may be introduced into the fuel tank means 11, 30 by admitting the same under pressure into the upper portion of the fuel filler pipe 40, whereupon it will flow laterally through the branch tube T and into the upper or reserve fuel tank means 30. When the reserve tank means 30 is substantially filled with fuel, the ball check valves 40a, 42a then permit the liquid fuel to flow downwardly past the same through the lower portion of the filler pipe 40 and entirely through the filler pipe extension 42 to enter the tank means 11.

The sidewalls of the lower and upper fuel flow components 21, 22 are provided with respective lateral fuel flow openings or passages 21e, 22e therethrough which are preferably located immediately adjacent to and inwardly of the end closure flanges 21c, 22c, respectively. A fuel sump conduit 50 is open at its lower end adjacent the bottom wall of the jettisonable fuel tank means 11 so that fuel in the latter tank means 11 may be drawn upwardly from the tank means and will flow into the cup-like housing 11b to which the upper portion of the fuel sump conduit 50 is communicatively connected. Thus, during normal operation of the aircraft with the jettisonable fuel tank means 11 occupying its normal operative position in cavity C, fuel will flow into the cup-like housing 11b and then upwardly through the lateral passages 21e and through the first and second intercommunicating separable fuel flow components 21, 22 and then outwardly through the lateral passages 22e in the upper or second fuel flow component 22. The lower portion of the reserve fuel tank means 30 is provided with a lateral passage 51 therein whose radially inner end communicates with a flanged annular member or ring member 52 which projects upwardly from the bottom wall 30a of the reserve fuel tank means 30 and whose flange portion overlies and normally sealingly engages the closure flange 22c of the upper or second fuel flow component 22. The radially outwardly or distal end of the passage 51 in the lower portion of the reserve fuel tank means 30 has a fuel line 53 communicatively thereto which leads to the engine of the aircraft so that the engine pumps the fuel out of the jettisonable fuel tank means 11 for normal operation of the engine.

In operation, upon the pilot or other operator in the aircraft effecting the releasing of the jettisonable fuel tank means 11, by effecting disengagement of the latches 12 with the keepers 12a in FIGS. 5, 6 and 7, it is apparent that the fuel tank means 11 will then drop out of the cavity C in the bottom of the fuselage 10a of the aircraft. Such movement of the jettisonable fuel tank means 11 away from the aircraft, and the consequent movement of the jettisonable fuel tank means 11 away from the reserve fuel tank means 30, separates the first and second fuel flow components 21, 22 previously held together by the latch means of FIGS. 5, 6 and 7. Thus, the springs 21a, 22a then push the first and second fuel flow components 21, 22 outwardly with respect to the respective fuel tank means 11, 30. By comparing FIGS. 8 and 9 it can be appreciated that the lower spring 21a in the jettisonable fuel tank means 11 moves the valve closure flange 21c upwardly against the inner surface of the upper wall 11a of the primary or jettisonable fuel tank means 11, thus preventing the flow of fuel outwardly from within the tank means 11 through the tubular guide means 23 which, of course, has also separated from the reserve fuel tank means 30. At this time, it will also be noted that the ball check valve 42a prevents fuel flow outwardly through the filler pipe extension 42 from within the jettisonable fuel tank means 11.

Referring to the portion of the self-sealing valve means 20 which remains with the fuselage 10a upon the fuel tank means 11 being jettisoned, by comparing FIGS. 8 and 9 it will be observed that the spring 22a biases the closure flange 22c axially away from the corresponding flange of the ring member 52 and against the upper surface of the bottom wall 30a of the reserve fuel tank means 30. In so doing, this prevents loss of fuel from tank means 30 through standard 30b and opens a space between the inner edge of the end flange of the ring member 52 and the upper surface of the closure flange 22c, thus permitting fuel to flow from the reserve fuel tank means 30 through the ring member 52 and outwardly through the radial passage 51 and the fuel line 53 for establishing open fuel flow communication between the reserve fuel tank means 30 and the engine as each fuel tank means 11, 30 is sealed against outward flow of fuel therefrom through the respective first and second fuel flow components 21, 22 thereof to prevent unintentional escaping of fuel from the fuel tank means 11, 30 through the respective fuel flow components 21, 22 while permitting continued operation of the aircraft 10 under power of the engine or engines 10c after the primary fuel tank means 11 has been jettisoned.

The base and supporting standard 30b for reserve fuel tank means 30 are of open construction to permit airflow therethrough from an airflow conduit 30d which extends forwardly and is open to atmosphere or to the slip-stream of the aircraft 10. Such airflow may prevent concentration of fuel vapor in the adjacent areas, especially upon jettisoning the primary fuel tank means 11.

According to the invention, parachute means are provided which are operatively connected with the jettisonable fuel tank means 11 and are operative in response to release of the jettisonable fuel tank means from the fuselage 10a for slowing the descent of the jettisonable fuel tank means 11. To this end, the parachute means, broadly designated at 60 (FIGS. 2–5), is normally in a packed condition in a canopy enclosure or pack 61 having a static line means 62 extending therefrom through a suitable opening in the bottom wall portion C-1 of the fuselage 10a of the aircraft 10. The jettisonable fuel tank means 11 has an opening 64 in its upper portion or wall 11a which is open through the upper wall 11a of the jettisonable fuel tank means 11 for receiving the packed parachute means therewithin while the fuel tank means 11 is secured to the fuselage 10a. The parachute receiving opening 64 is normally contiguous or proximal to the fuselage 10a while the fuel tank means is secured to the fuselage, and the opening 64 is exposed for release of the parachute canopy 65 (FIG. 3) upon release of the fuel tank means 11. It is apparent that the static line means 62 serves to release the canopy 65 from the pack closure 61, as is usual to open the canopy 65 in response to the release of the jettisonable fuel tank means 11 from the fuselage 10a, so as to slow the descent of the fuel tank means 11 and to thereby diminish the likelihood of the fuel tank means 11 rupturing and exploding upon its impact with the ground.

From the foregoing description, it can be seen that I have provided a jettisonable fuel tank means 11 for containing fuel and configured to fit within the cavity C in the bottom of the tail portion of the aircraft fuselage 10a to define with the fuselage a substantially aerodynamically smooth, streamlined outer surface. Latch means are provided for detachably securing the jettisonable fuel tank means 11 to the fuselage 10a and are operable for releasing the fuel tank means 11 from the fuselage, with a self-sealing valve means 20 interposed between the fuel tank means 11 and the fuselage 10a and operative in response to release of the fuel tank means from the fuselage for shutting off the fuel flow. Further, it can be seen that a normally packaged parachute means 60 is provided which fits normally in the opening 64 in the upper portion of the jettisonable fuel tank means 11 while the fuel tank means 11 is secured to the fuselage 10a and wherein the opening for the parachute means is normally contiguous to the fuselage or at least closely proximal to the same while the fuel tank means 11 is secured to the fuselage, wherein the opening 64 is exposed for release of the parachute canopy 65 upon release of the fuel tank means 11, and also wherein static line means 62 are connected to the fuselage and extend to the parachute means for releasing the canopy to open the same in response to release of the fuel tank means 11 from the fuselage for slowing the descent of the fuel tank means 11.

It can further be seen that there is provided a powered aircraft having an engine and a jettisonable fuel tank means 11 suspended from a portion of the aircraft with a reserve fuel tank means 30 carried by the aircraft, wherein communicative means 21, 22 (FIG. 8) normally interconnect the jettisonable fuel tank means 11 with the reserve tank means 30, with valve means 20 being operatively associated with the communicative means and adapted to normally maintain open fuel flow communication between the jettisonable tank means 11 and the engine 10c via the communicative means during normal operation of the aircraft. As disclosed, it can be appreciated that the valve means includes means responsive to the jettisoning of the jettisonable fuel tank means 11, and the consequent separation of the same from the aircraft, for interrupting fuel flow communication between the jettisonable fuel tank means and the engine and for establishing fuel flow communication between the reserve fuel tank means 30 and the engine or engines 10c.

In the drawings and specification, there has been set forth a preferred embodiment of the invention and although specific terms are employed, they are used in a generic and descriptive sense only and not for purposes of limitation.

That which is claimed is:

1. The combination comprising:
an aircraft fuselage having a tail portion defining a cavity;
fuel tank means for containing fuel and configured to fit within said cavity and define with said fuselage a generally aerodynamically smooth, streamlined outer surface,
latch means for detachably securing said fuel tank means to said fuselage and operable for releasing said fuel tank means from said fuselage,
valve means interposed between said fuel tank means and said fuselage and operative in response to release of said fuel tank means from said fuselage for shutting off fuel flow,
parachute means operatively connected with said fuel tank means and operative in response to release of said fuel tank means from said fuselage for slowing the descent of said fuel tank means,
a propelling engine attached to said aircraft fuselage,
a reserve fuel tank means carried by said fuselage, and
communicative means adapted for connecting both of said fuel tank means to said engine,
said valve means being operatively associated with said communicative means and adapted to normally maintain open fuel flow communication between said first-named fuel tank means and said engine while preventing fuel flow between said reserve fuel tank means and said engine during normal operation of the aircraft, and said valve means including means responsive to the releasing of said first-named fuel tank means from said fuselage for establishing open fuel flow communication between said reserve fuel tank means and said engine to permit continued operation of said engine after the first-named fuel tank means has been released from said fuselage.

2. The combination of claim 1 wherein said valve means is of a self-sealing type for effecting said shutting off of the flow of fuel from said fuel tank means.

3. In a powered aircraft having an engine and a jettisonable first fuel tank means suspended from a portion of the aircraft; the combination therewith of
a reserve fuel tank means carried by the aircraft,
communicative means normally interconnecting said first and reserve fuel tank means,
valve means operatively associated with said communicative means and adapted to normally maintain open fuel flow communication between said first tank means and said engine via said communicative means during normal operation of the aircraft,
and said valve means including
means responsive to the jettisoning of said first fuel tank means, and the consequent separation of the same from the aircraft, for interrupting fuel flow communication between said first fuel tank means and said engine and for establishing fuel flow communication between said reserve fuel tank means and said engine.

4. In a powered aircraft having an engine and a jettisonable first fuel tank suspended from a portion of the aircraft; the combination therewith of a reserve fuel tank carried by the aircraft,
communicative means for connecting said fuel tanks to the engine,
valve means operatively associated with said communicative means and being adapted to normally maintain open fuel flow communication between said jettisonable first fuel tank and the engine while preventing fuel flow communication between said reserve fuel tank and the engine during normal operation of the aircraft, and said valve means including
means responsive to the jettisoning of said first fuel tank from the aircraft for establishing communication between said reserve fuel tank and the engine to permit continued operation of the aircraft under power of the engine after the first fuel tank has been jettisoned.

5. In a powered aircraft having an engine and a jettisonable first fuel tank means suspended from a portion of the aircraft; the combination therewith of
a reserve fuel tank means carried by the aircraft,
communicative means normally interconnecting both of said fuel tank means and including first and second normally intercommunicating separable fuel flow components attached to said first fuel tank means and said reserve fuel tank means, respectively,
valve means operatively associated with said communicative means and adapted to normally maintain open fuel flow communication between said first fuel tank means and said engine via said first and second fuel flow components during normal operation of said aircraft, and said valve means including
means responsive to the jettisoning of said first fuel tank means, and the consequent separation of said first and second components of said communicative means, for establishing open fuel communication between said reserve fuel tank means and the engine and for sealing each fuel tank means against the outward flow of fuel therefrom through the respective first and second fuel flow components thereof to prevent unintentional escaping of fuel from the fuel tank means through the respective fuel flow components thereof.

* * * * *